United States Patent Office.

JOHN MATTHEWS, OF NEW YORK, N. Y.

IMPROVEMENT IN AERATED SEA-WATER.

Specification forming part of Letters Patent No. 168,269, dated September 28, 1875; application filed August 5, 1875.

*To all whom it may concern:*

Be it known that I, JOHN MATTHEWS, of the city of New York, in the county and State of New York, have invented certain new and useful Improvements in Aerated Sea-Water; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The value of mineral waters as dietetic, sanitary, and remedial agents is well known. Natural springs heretofore have been considered the best, and especially those charged with carbonic-acid gas. Imitations of many of the natural waters have been prepared by mixing the materials, as ascertained by analysis, dissolving the mixture, and charging with carbonic-acid gas. But owing to the imperfections in the methods of analytical chemistry the artificial preparations have never obtained a value equal to the natural waters. The use of spectrum analysis has to some extent explained the difficulty without being able to obviate it. The spectrum analysis shows that the natural waters contain elements of which the old methods failed to note the existence. But as spectrum analysis does not give the quantity of each element, or even the relative proportion of some of the most important, it has not been possible to prepare artificial compounds which would truly represent and produce the beneficial effects of the natural waters.

The ocean, or sea-water, holds in solution the greatest number of the most valuable salts to be found in mineral waters. When taken at a sufficient distance from the shore to be uninfluenced by the waters from rivers and lakes, it is nearly uniform over all the great oceans. It is also perfectly free from all decaying organic matters. Sea-faring men have long known the benefit of a drink of pure sea-water as a remedial agent.

My invention is based on these facts and considerations; and consists in taking pure sea-water, either as it naturally exists, or diluted with pure water from other sources, and charging it with carbonic acid, and then bottling it as mineral waters are ordinarily put up, or putting it into suitable fountains to be dispensed on draft, either pure or mixed with water, or with other beverages or liquids.

In carrying out my invention, I collect the pure water of the ocean at a sufficient distance from shore, say, ten to fifteen miles, so as to be free from all land influences, and then charge it with carbonic acid in a soda-water apparatus. It is then either bottled or put into strong fountains to be dispensed as is common with artificial and natural mineral waters.

By this method I produce a new and valuable mineral water of great uniformity, and one containing the largest number of valuable medicinal salts.

It has been proposed to evaporate sea-water and use the dry salt. But this involves consideral expense, and the act of evaporation decomposes several of the more delicate salts, changes others, and drives off such as are volatile. Even the air naturally contained in sea-water is believed to possess valuable properties.

By my process all the elements and compounds are retained in their natural condition, and the charging with carbonic acid renders them pleasant as a beverage. Besides, the carbonic acid itself is beneficial in water used as a beverage.

Having thus described my invention, what I claim, and desire to secure by Letters Patent, is—

The new manufacture herein described—sea-water charged with carbonic-acid gas and inclosed in bottles or other air-tight vessels, substantially as specified.

In testimony that I claim the foregoing as my own, I affix my signature in presence of two witnesses.

JOHN MATTHEWS.

Witnesses:
B. F. HALL,
E. D. DUNCAN.